April 5, 1955 S. S. KISTLER Re. 23,976

CYLINDRICAL LINER

Original Filed Nov. 24, 1950

Inventor

SAMUEL S. KISTLER

By [signature] Attorney

United States Patent Office

Re. 23,976
Reissued Apr. 5, 1955

23,976

CYLINDRICAL LINER

Samuel S. Kistler, Salt Lake City, Utah, assignor to Norton Company, Worcester, Mass., a corporation of Massachusetts Original No. 2,673,131, dated March 23, 1954, Serial No. 197,278, November 24, 1950. Application for reissue December 24, 1954, Serial No. 477,601

22 Claims. (Cl. 309—3)

Matter enclosed in heavy brackets [ ] appears in the original patent but forms no part of this reissue specification; matter printed in italics indicates the additions made by reissue.

The invention relates to liners for cylinders such as those of internal combustion engines and of pumps and for use as bearings for spindles and shafts. This application is a continuation in part of my copending application Serial No. 23,082, filed April 24, 1948, now abandoned.

One object of the invention is to provide a liner of long life. Another object of the invention is to provide a liner of great resistance to wear. Another object of the invention is to provide a cylinder liner which will very slightly wear cast iron and steel piston rings. Another object of the invention is to provide a cylinder liner which will very slightly wear piston rings or pistons made of any metal.

Another object of the invention is to provide a refractory liner. Another object of the invention is to provide a liner of some or all of the above characteristics which is nevertheless highly resistant to cracking and spalling.

Another object is to provide a liner that is highly resistant to the corrosion action of condensed moisture when the engine is cold. Another object of the invention is to provide a liner of sufficient strength to resist the explosion wave. Another object of the invention is to strengthen a liner made of refractory material so that it can successfully be used in internal combustion engines.

Another object of the invention is to strengthen a liner [tmade] *made* of refractory material so that it can successfully be used in oil wells operating under very high pressures.

Another object of the invention is to provide a cylinder liner for use as the bearing for the journal portion of a spindle or shaft. A particular example of the foregoing is a liner for the spindle which holds the grinding wheel in a grinding machine.

Other objects will be in part obvious or in part pointed out hereinafter.

In the accompanying drawings illustrating four of many possible embodiments of the mechanical features of this invention.

Figure 1:
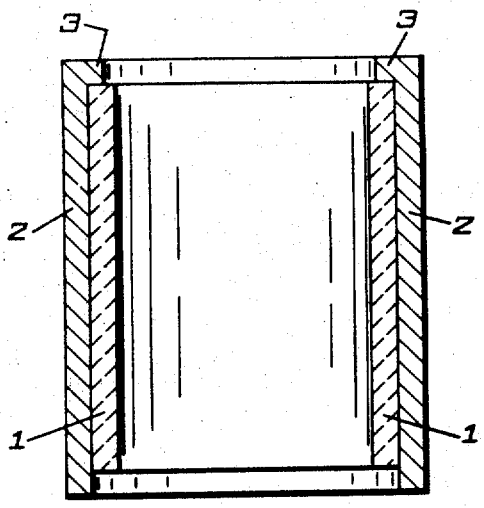
Figure 2:
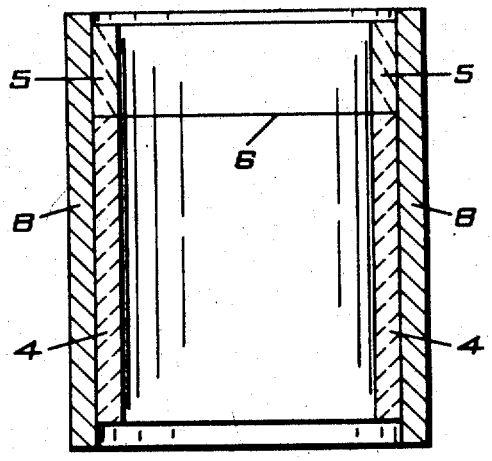
Figure 3:
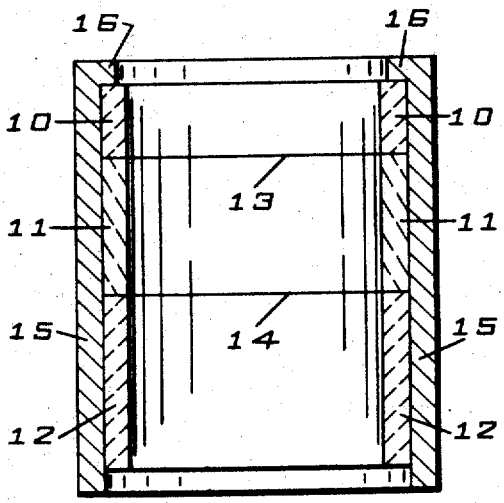
Figure 4:
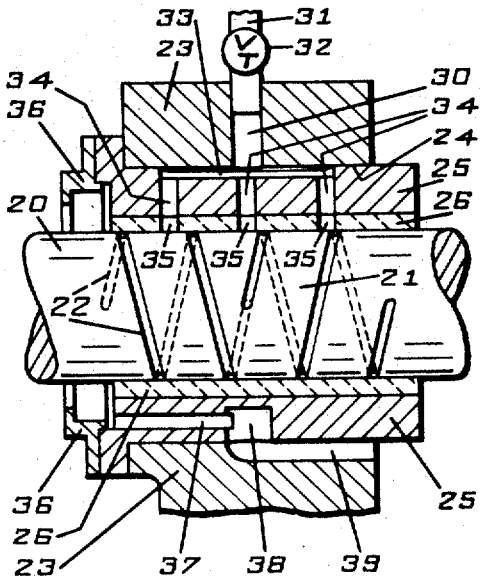

Figures 1, 2 and 3 are axial sectional views of cylindrical liners inside of metal sleeves, Figure 4 is an axial sectional view of a bearing for the spindle of a grinding machine.

Referring to Figure 1, I provide a cylindrical liner 1 inside of a steel sleeve 2 having an inturned flange 3. The steel sleeve 2 is in compression against the liner 1 both radially and axially. This may be achieved by making the sleeve 2 of slightly less inside diameter than the outside diameter of the liner 1, then heating the sleeve 2 quite hot, say about 500° C., and then pushing the liner 1 thereinto until it contacts the flange 3. When the sleeve 2 cools, it exerts compressive force in radial directions against the liner 1 because the sleeve 2 shrinks in cooling, and furthermore, the sleeve 2 shrinks in an axial direction as well as in a radial direction and therefore the flange 3 is drawn against the end of the liner 1 and exerts a compressive force on it in an axial direction. I have found that it is desirable to heat the liner 1 as well as the sleeve 2 in this operation as otherwise there is danger that the liner 1 will be cracked by thermal shock. The liner 1, being made of ceramic material as hereinafter defined, does not expand so much as does the sleeve 2 when each of them is heated to the same temperature. Furthermore the sleeve 2 may be heated to a higher temperature for example 100° C. hotter than the liner 1 with little danger of cracking the liner 1 when the latter is introduced into the sleeve.

The liner 1 is made of essentially crystalline material selected from the group consisting of aluminum oxide $Al_2O_3$, silica $SiO_2$, magnesium oxide MgO, and zirconium oxide $ZrO_2$ and compounds and mixtures thereof, the hard crystals in the material having a hardness greater than 1000 on the Knoop 100 scale. These materials include crystalline alumina, mullite $3Al_2O_3 \cdot 2SiO_2$, spinel $MgO \cdot Al_2O_3$ and zirconia $ZrO_2$ which latter should preferably have from 3% to 6% of lime CaO in solid solution in the crystals thereof. Thus other oxides than those above mentioned in solid solution in the crystals are not excluded and may be beneficial as in the case of lime in solid solution in the zirconia crystals in the amount indicated. There should be no more than 10% of all material other than alumina, mullite, spinel and zirconia in the liner except that hafnia, which is chemically practically indistinguishable from zirconia, is calculated as zirconia.

Alumina is the best material now known to me for the manufacture of the liners 1 and the most satisfactory process of manufacture now known to me is the cold pressing and subsequent sintering process. I will therefore describe the manufacture of liners out of alumina.

EXAMPLE I

There is a variety of fused alumina of high purity, usually better than 99% $Al_2O_3$, which is white in color and which in the ingot is porous and has a small percentage, well under 1%, of soda $Na_2O$ therein. This material when crushed very fine becomes essentially not porous because the pores have disappeared due to the crushing. I take a quantity of this material of a size known as 900 which means that the particles have an average size of about seven microns but that some of the particles are very small, down to one micron or less and that the material is a mixture of particle sizes. It is impossible to define the actual size of the particles but this material is a commercially available material well known to the art and is sufficiently indicated by the above description. I further provide a quantity of clay-like calcium-magnesium silicate such as the mineral hectorite. Taking 98% by weight of the above mentioned crystalline alumina which is a "fused" alumina and 2% by weight of the hectorite, I mix them in any suitable mixer such as a kneader, or dough mixer with an additional 8% by weight of a 2% solution of methyl cellulose in water. Then I screen the mixture through a 16 mesh screen and the material is ready for molding.

I mold this material in a rubber lined mold having a steel arbor of cylindrical shape. The pressure is applied by hydraulic fluid against the outside of the rubber liner. I prefer a pressure of about 5000 pounds per square inch. The pressed article is then removed from the mold and after drying is fired under cone 35 conditions. Cone 35 firing conditions can be obtained by heating to a top temperature of 1750° C. holding that temperature for three hours.

The outside surface of this liner 1 is then ground to an accurate cylindrical surface as by means of a diamond grinding wheel and the liner 1 is then inserted into the steel sleeve 2 which has been heated, as above described. Then, after the parts have cooled, the inside surface of the liner 1 is ground [perferably] *preferably* with a diamond grinding wheel to a smooth and accurate running surface. Both cylindrical surfaces of the sleeve 2 are carefully ground, the inside before assembly and the [outeside] *outside* after assembly.

EXAMPLE II

There is also available on the market a calcined but not recrystallized alumina known as Bayer process alumina. This is of high purity better than 99% pure, and is the material from which the alumina of Example I is made by fusing in an electric furnace. This calcined alumina is made by heating aluminum hydroxide to a temperature of about 1000° C. I take a quantity of this material having low soda content to the amount of 98% by weight of the solid portions of the mix, 1% of fine calcined magnesia, and 1% of calcium borosilicate frit. This mixture is then ball-milled wet for six hours in a porcelain lined mill with flint pebbles, dried and screened through a 40 mesh screen. The resultant powder is then mixed with 5½% of a 2% solution of methyl cellulose in water and the mixture is screened through a 16 mesh screen and molded as described in Example I preferably at about 5000 pounds per square inch. The resultant piece is then dried and fired at cone 32 (1700° C. for three hours) after which it is ground and inserted into a steel sleeve 2 as previously described and then the interior surface is ground as specified in Example I.

The advantages of a hard liner is an internal combustion engine cylinder include high resistance to wear and a low rate at which metal parts in moving contact with it are worn. The wearing-away of a cylinder wall is largely due to three effects, namely the abrasive action of dust, seizing and tearing of metal surfaces in contact, and corrosion due to condensation of moisture when the cooling water temperature is below about 140° F. Under ordinary circumstances the hardest material in the dust consists of quartz particles which have a hardness of 820 on the Knoop 100 scale. Therefore if the cylinder liners are 1000 or harder, little abrasion will be effected. The hardest tool steel has about the hardness of quartz and is therefore on the lower edge of the acceptable hardness range.

When metals are rubbed over each other, microscopic points tend to sinter together and tear pieces out even with lubrication, and this effect is most pronounced if the two surfaces are of the same metal, but is also observable when they are different as copper and steel. Cast iron piston rings, therefore, rubbing over a cast iron cylinder wall, both wear it and are worn by it. However, when the cylinder wall is nonmetallic in nature, as are the above substances, there is a greatly reduced tendency for the surfaces to cohere and tear each other or such tendency is entirely eliminated.

During the warming up period of a motor, condensation of moisture occurs on the walls of cylinders during every power stroke until the walls are at a temperature above about 140° F. In fact, it is regarded as bad practice to have the cooling water circulated in the jackets at a temperature below 140° F., which means that the walls should operate at substantially higher temperatures. The water condensed on the walls, in the presence of carbon dioxide under pressure and traces of sulfur dioxide, is very corrosive and may account for a large fraction of the observed cylinder wall wear.

The substances listed above are all highly resistant to the attack of water under these conditions and therefore experience negligible corrosive wear compared to cast iron or steel. Not only do the cylinder walls, when lined with the substances listed, not wear as rapidly as cast iron or steel walls, but a surprising result is the fact that metal pistons and metal piston rings sliding on these walls are worn very much less than on cast iron or steel. In the case of a sintered alumina liner, the piston rings and piston wore only a small fraction as fast as when used in cast iron or steel cylinders. The explanation appears to lie in the reduced tendency for seizure and scoring to occur and in the fact that whereas a hard dust particle can imbed in cast iron or the softer steels and therefore serve as an abrading point for many excursions of the piston and rings, the dust particles being softer than the liners referred to here cannot imbed and are swept away with the first stroke of the piston, thus producing very little abrasion of the piston and rings.

While the strength of the materials listed is not equal to that of many metals, I have reduced the importance of strength by shrinking a steel sleeve onto the liner, so that all of the materials are adequately strong for the purpose. These hard substances are very strong in compression but weak in tension so that by applying a compressive stress on the liner, by means of the steel sleeve, so great that at no time during the working cycle of the engine will any portion of the liner be under tension, I take advantage of the natural physical properties of the liner material and have achieved complete success in avoiding breakage. I shrink the steel sleeve onto the liner with such shrink interference as to put the latter under approximately 30,000 pounds per square inch tangential compression. This compressive stress may be made greater or less depending upon the design of a particular engine but should be at least 8000 pounds per square inch tangential compression.

If there were no flange 3 on the upper end of the steel sleeve the liner 1 might expand axially more than the sleeve 2, due to a temperature gradient between the liner and the sleeve when the engine is operating under load, and then when the power is shut off and both parts cool the liner might not have sufficient tensile strength to draw itself together again, which might result in a crack forming radially through the liner in a plane perpendicular to its axis and approximately one-third of the distance from the top of the liner to the bottom of the piston stroke. This crack would do no harm provided it formed a complete circle and were not a helical crack. In the latter case it would be possible for a piece of the liner to break out.

Referring now to Figure 2, I therefore may provide a liner in two parts 4 and 5 the dividing line 6 being preferably about one-fourth to one-third of the distance from the top of the upper liner 5 to the bottom of the piston stroke. This arrangement eliminates cracking from the cause above noted. This liner 4, 5 is made of any of the materials hereinbefore indicated as suitable materials for the liner 1 and the parts thereof are preferably formed by sintering as in the case of the liner 1. Surrounding the liner 4, 5 is a steel sleeve 8 in compression against the liner 4, 5, as above described in the case of the steel sleeve 2 but this steel sleeve 8 need not have any inwardly extending flange. I find that cast iron piston rings readily slide over the dividing line or junction 6 without any deleterious effects.

However, the differential expansion of the liner and sleeve can be nearly prevented by the use of the flange 3 as represented in Figure 1 and this is the preferred embodiment of my invention. Differential expansion between liner and sleeve is quite variable from one liner material to another due to large differences in coefficient of expansion. For example, aluminum oxide has a coefficient of expansion of about $7.5\times10^{-6}$ per degree centigrade while that of steel is about $12\times10^{-6}$. It will be seen, therefore, that when heat is applied from the inside by the combustion of gases, the liner will be heated up more than the steel sleeve and may or may not expand more than the sleeve depending upon the temperature gradient through the walls and the coefficient of expansion. In the case of sintered aluminum oxide in a motor running at full throttle, the liner expands more than the sleeve. This statement applies to the top end of the liner, and conditions vary from top to bottom due to variable exposure time of the liner to heat so that no simple rules can be established. However, by combination of the steel flange and a liner made of two or more sections all operating conditions can be met successfully with the above materials.

Figure 3 illustrates a liner of one of the above described materials in three parts 10, 11 and 12 divided at 13 and 14 inside of a steel sleeve 15 under compression as indicated and having an inwardly extending flange 16. For many engines, especially those having large cylinders, this construction will be preferred.

As a test of the effectiveness of the compressive stress on the liner to prevent cracking due to thermal shock, a liner of sintered aluminum oxide was assembled with a steel sleeve providing compressive stress in the liner of 30,000 lbs./sq. in. tangentially. An oxy-gas flame from a blast lamp was directed upon a spot on the inside of the liner, but in spite of the highly concentrated and asymmetric heat no cracking occurred.

An unexpected favorable behavior of the liners has been that with continued use the surface roughness decreases although the wear is so small as to be unmeasurable in 600 hours of operation at 2200 R. P. M. and full throttle.

To illustrate the surprising reduction in wear, on the cast iron piston rings, the data below were obtained comparing a sintered alumina liner with a cast iron liner in a single cylinder air cooled engine operating at 2200 R. P. M. with full throttle, and driving a dynamometer. In each case the engine was run for 400–600 hours with frequent inspection, and the wear was calculated to an average per 100 hours.

The second column gives the actual loss of weight by each ring on a cast iron liner in 100 hours. The third column gives the loss of weight of the rings on an alumina liner made as above described in accordance with my invention, as a percentage of the loss of weight on cast iron.

TABLE I

| Ring | Cast Iron, grams | Alumina, percent |
|---|---|---|
| top | 0.088 | 27 |
| middle | 0.037 | 28 |
| bottom | 0.065 | 32 |

Similarly, an aluminum alloy piston showed much less wear on a sintered alumina liner according to this invention, but due to the deposition of carbon and the difficulty of precise micrometer measurements the data are not as reliable and are therefore not given here. The rate of wear of cast iron cylinder walls or cast iron liners is easily measurable, but we were unable to find any wear on the sintered alumina liner according to this invention in 600 hours of operation.

The preferred manner of grinding the liners is to clamp the sleeve 2, 8 or 15, as the case may be, in the chuck of an internal grinding machine, and then to grind a true cylindrical surface on the inside of the liner 1 or 4, 5 or 10, 11, 12 as the case may be. This may be done with a suitable internal grinding machine and a diamond grinding wheel is preferably used. A very fine finish and accurate surface can be produced using a vitrified bonded diamond grinding wheel, but other types of grinding wheels can be used such as metal bonded or resin bonded diamond grinding wheels and in certain cases vitrified bonded silicon carbide wheels can be used.

Since alumina, mullite, spinel and zircona have low tensile strength, it is undesirable to subject the liner 1 etc. to high tensile stress for fear of cracking them. Therefore, a pump liner should be put under such compression upon assembly that at the maximum pressures expectable in the pump the liner will not be in tension. A simple and safe rule to follow in making cylindrical liners for pumps is to make the shrink interference between sleeve and liner at least as much as the sleeve would expand if it were subjected to the maximum internal pressure expectable in the pump of course allowing for pressure surges such as occur in a pump in use.

Therefore if p is the maximum pressure, r is the internal radius of the sleeve, t is the wall thickness of the sleeve, E is the modulus of elasticity of the metal in the sleeve and I is the shrink interference between the internal diameter of the sleeve and the external diameter of the liner, $$I=\frac{2r^2p}{tE}$$

For example if the internal diameter of the pump liner is 4 inches, the pressure to be pumped is 1000 pounds per square inch, the sleeve thickness is 0.25 inch and the modulus of elasticity of the sleeve is 29,000,000 pounds per square inch $$I=0.0011 \text{ inch}$$

Since destructive surges can occur in liquid pumps, good practice would suggest doubling this figure.

If the liner has a thickness t, then the tangential compressive stress S in the liner can be calculated from the equation $$S=\frac{ItEE'}{2r(tE+TE')}$$

where E′ is the modulus of elasticity of the liner.

If the liner is ⅛ inch thick and made of sintered alumina with E′=50,000,000 pounds per square inch and I=0.0022″, the *tangential* compressive stress in the liner will be [14,800]*13,900* pounds per square inch, a load easily supported.

A pressure of 1000 pounds per square inch is what would be required to pump oil of a density of 0.9 out of a well 2560 feet deep.

Many pumps handling abrasive slurries do not have to operate against much pressure. However for practical purposes it is desirable to support the liner by a shrink interference of at least 0.0001 inch per inch of diameter, which in the above case would put the liner under a tangential compressive load of 2700 pounds per square inch.

In another embodiment the invention is a bearing for a spindle or shaft. Referring now to Figure 4, a spindle

20 for the grinding wheel of a grinding machine has a journal portion 21 having a helical oil groove 22 therein. This spindle 20 is, of course, made of steel. A portion of the wheel-head 23 has a cyclindrical bore 24 in which is received a steel sleeve 25 which is in compression against a liner 26 of essentially crystalline material selected from the group consisting of aluminum oxide, silica, magnesium oxide and zirconium oxide and compounds and mixtures thereof, the hard crystals in the material having a hardness greater than 1000 on the Knoop 100 scale. The preferred material is aluminum oxide which can be made as described in Examples I and II. The sleeve 25 is shrunk onto the line 26 in the manner above described. The compressive stress required depends upon the machine and the particular kind of grinding operation the machine is to perform, and for many machines and many grinding operations this compressive stress need not be great. For the journalling of shafts in a transmission system the compressive stress might be as low as 100 pounds per square inch. However for external cylindrical grinding machines of six inch swing and larger the compressive stress should be at least 2000 pounds per square inch and may be greater.

Referring again to Figure 4, an oil channel 30 is shown in the wheelhead casting 23 to which oil is conducted by a pipe 31 having a valve 32, and the oil enters a chamber 33 from which extend passages 34 in the sleeve 25 to holes 35 through the liner 26 thus to lubricate the bearing surface of the liner 26 which has been ground as by means of a diamond grinding wheel. The oil escapes in an axial direction into a collecting ring 36 being driven thereto by the groove 22. From the ring 36 the oil drains through a passage 37 in the sleeve 25 to a chamber 38 therein and thence through a passage 39 in the wheelhead 23 to any suitable oil collector or sump whence it is pumped back again through the pipe 31. The holes 35 can be made with a diamond core drill.

In order that the meaning of hardness of at least 1000 on the Knoop 100 scale may be fully understood, I give below a table of hardness values and note that "Knoop 100 scale" means determined with a Knoop machine having a 100 gram load. In the Knoop machine the penetration of a diamond point gives the measure of hardness.

TABLE II

| Mohs' Scale | Knoop 100 Scale | Materials |
|---|---|---|
| 6 | | Othoclase. |
| | 820 | Quartz (silica). |
| | 1090 to 1270 | Zirconia. |
| 7 | 1200 | Mullite. |
| | about 1250 to 1300 | Spinel. |
| | 1340 | Topaz. |
| 8 | 1360 | Garnet. |
| | 1280 to 1410 | Zircon. |
| 9 | 2000 | Corundum (alumina). |

EXAMPLE III

Another example of the manufacture of cylindrical liners is as follows: a mixture of 50 parts of calcined kyanite, 20 parts of Florida kaolin and 30 parts of calcined alumina which may be the aforesaid Bayer process alumina, all parts by weight, is placed in a porcelain-lined mill with flint pebbles and water and is ball-milled until the average particle size is approximately 10 microns. The resultant ball-milled slip is then filtered and dried thus producing a cake. The cake is then mixed in a suitable mixer, such as a Simpson type mixer, with 7% of water and 1% dextrine based on the weight of the dried cake. This mix is then molded as described in Example I into tubes which are dried and fired at a temperature preferably between about 1600° C. and 1650° C. The resultant liners are then inserted into heated sleeves as above described to make any of the articles herein described, the two parts being ground, inside and outside, in the order and in the manner above described.

Kyanite is a natural mineral and like sillimanite and [endalusite] *andalusite* has the formula $Al_2O_3.SiO_2$. In this example sillimanite or andalusite could be substituted. The resultant product is substantially mullite $3Al_2O_3.2SiO_2$

EXAMPLE IV

A spinel is first produced by the fusion together of stoichiometric proportions of magnesium oxide and aluminum oxide to form $MgO.Al_2O_3$. This is fed into a porcelain-lined ball-mill and milled with flint pebbles and water to an average particle size of between 3 and 10 microns diameter. The resultant slip is filtered, dried and mixed with 5% of a 2% solution of methyl cellulose and water and 1% of dextrine using a mulling mixer or the equivalent. The fine powder is molded, fired, mounted and ground as in the case of Example III.

EXAMPLE V

The same procedure is followed as in the case of Example IV excepting that twice as much alumina as necessary to form the $MgO.Al_2O_3$ is used. After processing as explained in Example IV the resultant liner is a cubic crystalline spinel carrying the excess alumina in solid solution. Liners made in accordance with this example are harder and more wear-resistant than those made in accordance with Example IV.

EXAMPLE VI

I procure a quantity of lime stabilized zirconia as described in the copending application of Archibald H. Ballard and Douglas W. Marshall Serial No. 139,532 filed January 19, 1950 now Patent No. 2,535,526 granted December 26, 1950. This is defined as a stabilized zirconium oxide characterized by having a crystal structure predominantly in the cubic system and the oxide having crystallized from a fusion of zirconium oxide containing ore with calcium oxide as a stabilizing agent, the quantity of calcium oxide being from 3% to 6% of the amount of $ZrO_2$ in the ore, the calcium oxide being in solid solution in the zirconium oxide crystals. I ball-mill this material in water in a steel ball-mill using steel balls until its average particle is between 3 and 10 microns in diameter. I then treat the slurry with hydrochloric acid to remove the iron, wash it to remove the iron salts and dry it. I mix the resultant powder in a suitable mixer with 1% of dry dextrine and sufficient 2% solution of methyl cellulose in water to make the material sufficiently moist to cake slightly on compression. This material is then placed in a rubber lined mold as described in Example I and pressed into the shape of a tube at a pressure about 5000 pounds per square inch, dried and fired at between about 1750° C. and 1800° C. The resultant liner is mounted in a steel tube under compression as previously described to make any of the articles hereinbefore described, the interior surface of the liner being ground as in the other examples. This material is dense, relatively non-porous and very resistant to attrition.

One of the expensive features of making cylindrical liners in accordance with this invention as above described is the requirement of grinding the external cylindrical surface of the liner 1 or 4 and 5 or 10, 11 and 12 or 26, as the case may be. It is important to provide good contact between the liner and the metal sleeve throughout the interfacial area to avoid load concentrations in small areas that might lead to cracking. Alumina, mullite, spinel and zirconia are hard materials as above explained and especially in the case of alumina this grinding is preferably done with a diamond grinding wheel which is expensive. Accordingly for certain uses I have devised other embodiments of the invention which can be made at less expense and which for the purposes intended will readily meet the requirements of practical use. These further embodiments of the invention are illustrated in the following examples.

EXAMPLE VII

An alumina liner 1 having an internal diameter of five and three-quarters inches and having a quarter inch wall was to be fitted into a steel sleeve 2 for use in pumping oil well drilling mud. The outside of the cylinder was coated by applying with a brush a one-sixteenth inch layer of bisphenol epichlorhydrin polymer cold setting cement. In order to prevent sagging of this viscous cement during hardening, the liner was supported on a horizontal arbor and was rotated on its axis for about one hour during which time the cement set to a non-sagging consistency. After twenty-four hours the cement was very hard and strong and was machined to an accurate cylindrical surface. In this case it was not appropriate to heat both the liner and the steel sleeve since the organic cement would be injured, so the sleeve alone was heated to 135° C. which was sufficient to permit a shrink interference great enough to protect the liner from tensile stresses when pumping mud at moderate pressures. In cases where it is desired to have a greater shrink interference the liner can be cooled with carbon dioxide snow before assembly. I have been successful in cooling liners in this manner to temperatures of the order of minus 75° C.

EXAMPLE VIII

A liner four inches in inside diameter by ten and five-eighths inches long by five-sixteenths inch thick made of alumina as described in Example I was to be mounted in a bronze sleeve for pumping salt water into an oil well. The outside surface of the alumina liner 1 was coated with a one-quarter inch thick layer of high alumina cement having approximately the chemical formula $3CaO.5Al_2O_3$. This coated liner was kept moist for 20 days in order to permit the cement to harden properly. The liner was then mounted in a cylindrical grinding machine and ground to an outside diameter of 4.750 inches using a silicon carbide grinding wheel. The inside surface of the bronze sleeve was ground to a diameter of 4.746 inches. Both the sleeve and liner were then placed in an oven and heated to a temperature of 250° C. at which temperature the bronze had expanded enough more than the alumina so that the liner could readily be slipped inside of the sleeve. After cooling the bronze sleeve had shrunk upon the cement coated alumina liner with such pressure as to support it adequately for the purpose intended.

EXAMPLE IX

Since the thermal conductivity of alumina is high and the thermal conductivity of metals is still higher I have found that a substantial fraction of the resistance to flow of heat from the interior of a diesel engine equipped with my cylindrical liners to the cooling jacket thereof is due to contact resistance between the parts. I find that this contact resistance can be greatly reduced if the contact is metal to metal and if there is an integral coating of metal on the liner made of any of the materials herein specified. Furthermore the problem of creating a perfect cylindrical surface on the liner is thereby greatly simplified. A five and three-quarters inch diameter liner fifteen inches long and one-quarter inch thick made of alumina as specified in Example I was intended for use in a diesel engine. This liner was supported horizontally in a lathe and rotated slowly while the outer surface was sprayed with a coating of copper to a depth of .04 inch. Spraying was done with a metal spraying gun the metal being supplied in the form of wire and being melted by an oxy-acetylene flame. Such apparatus is now well known in industry. A sharp cutting tool was then mounted on the lathe and the outer surface of the liner coated with copper as above described was carefully machined to a smooth cylindrical surface 6.275 inches in diameter. This was assembled in the manner described in Example VIII with a steel sleeve having an inside diameter of 6.269 inches using a temperature of 400° C. Since many metals can be sprayed, this embodiment is not limited to copper. Furthermore a layer of metal can be formed upon the surface of a liner made out of any of the materials herein specified by coating it with a thin film of graphite and electrodepositing the metal.

Also plastics, such as ethyl cellulose, polyethylene and vinyl acetate can be sprayed upon the outer surface of the liner and there are other ways of applying plastic, inorganic cements and metals upon the outer surfaces of liners made of materials herein specified.

In the preferred form of my invention the material of the liner is selected from the group consisting of crystalline alumina, mullite, spinel and zirconia. Although I prefer zirconia stabilized with from 3% to 6% of lime as this has better thermal characteristics than unstabilized zirconia, for many uses such as for bearings unstabilized zirconia crystallized predominantly in the monoclinic system can be used.

The word liner has herein been used to mean the parts 1, 4, 5, 10, 11, 12 and 26 and also, in some cases, to mean the entire article as illustrated for example in Figures 1, 2 and 3 and the parts 25 and 26 of Figure 4. However the context in each case indicates in which manner the word is used. While in most cases I prefer a steel sleeve for the outer part of my cylindrical liner, a bronze sleeve can be used in some cases as indicated in Example VIII, and the sleeve can be made of other metals such as, for example, brass or aluminum, depending upon the particular use for the cylindrical liner. In any use of the cylindrical liner of this invention where the internal surface is a running surface to be engaged by a reciprocating, rotating, oscillating or vibrating metal part, the liner of the invention will last longer under practically any conditions met with in practical use. While it is contemplated that oil or other lubricating material will be supplied to the running surface, the liner of the invention will longer withstand use without oil than will a steel or bronze cylinder or bearing etc., other conditions being equal.

*In the claims the parameters of compression of 8000 and 100 are to be interpreted in accordance with the two minimums given in the specification as tangential compressive stress in the liner. There is no compressive stress in the liner due to the compression against it of the sleeve except tangential compressive stress which is why "compressive stress" in the specification always has the interpretation "tangential compressive stress" whether the adjective "tangential" is used or not. Hence in the following claims "in compression against the (or said) internal liner to the extent of at least 100 (or 8000 pounds per square inch" means that the liner is under compressive stress tangentially to the extent of at least 100 (or 8000) pounds per square inch of its cross section and similarly the expression in the claims 'in compression against said exterior to the extent of at least 100 pounds per square inch" means tangential compressive stress in the liner to the extent of at least 100 pounds per square inch of its cross section.*

It will thus be seen that there has been provided by this invention cylindrical liners for the cylinders of internal combustion engines and of pumps and for use as bearings for spindles and shafts in which the various objects hereinabove set forth together with many thoroughly practical advantages are succesfully achieved. As many possible embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. A cylindrical liner assembly comprising an internal cylindrical liner having a ground internal cylindrical surface, and an external cylindrical sleeve made of metal and in compression against said internal liner to the extent of at least 100 pounds per square inch, said internal liner being essentially non-porous and being made of essentially crystalline material selected from the group consisting of aluminum oxide, silica, magnesium oxide and zirconium oxide and compounds and mixtures thereof, the hard crystals in the material having a hardness greater than 1000 on the Knoop 100 scale.

2. A cylindrical liner assembly comprising an internal cylindrical liner having a ground internal cylindrical surface, and an external cylindrical sleeve made of metal and in compression against said internal liner to the extent of at least 100 pounds per square inch, said internal liner being essentially non-porous and being made of essentially crystalline material selected from the group consisting of alumina, mullite, spinel and zirconia, said crystalline material having a hardness greater than 1000 on the Knoop 100 scale and there being no more than 10% of all material other than said material selected from the group consisting of alumina, mullite, spinel and zirconia in said internal liner.

3. A cylindrical liner assembly according to claim 1 in which the sleeve is in compression against the internal liner to the extent of at least 8000 pounds per square inch.

4. A cylindrical liner assembly according to claim 2 in which the sleeve is in compression against the internal liner to the extent of at least 8000 pounds per square inch.

5. A cylindrical liner assembly comprising an internal cylindrical liner having a ground internal cylindrical surface, and an external cylindrical sleeve made of metal and in compression against said internal liner to the extent of at least 100 pounds per square inch, said internal liner being essentially non-porous and being made of crystalline alumina and there being no more than 10% of all material other than said alumina in said internal liner.

6. A cylindrical liner assembly comprising an internal cylindrical liner having a ground internal cylindrical surface, and an external cylindrical sleeve made of metal and in compression against said internal liner to the extent of at least 8000 pounds per square inch, said internal liner being essentially non-porous and being made of crystalline alumina and there being no more than 10% of all material other than said alumina in said internal liner.

7. A cylindrical liner assembly according to claim 1 in which the sleeve has a flange in engagement with one end of said internal liner and exerting a compressive force on it in an axial direction.

8. A cylindrical liner assembly according to claim 2 in which the sleeve has a flange in engagement with one end of said internal liner and exerting a compressive force on it in an axial direction.

9. A cylindrical liner assembly according to claim 5 in which the sleeve has a flange in engagement with one end of said internal liner and exerting a compressive force on it in an axial direction.

10. A cylindrical liner assembly according to claim 6 in which the sleeve has a flange in engagement with one end of said internal liner and exerting a compressive force on it in an axial direction.

11. A cylindrical liner assembly comprising an internal cylindrical liner having a ground internal cylindrical surface, an external cylindrical sleeve made of metal and in compression against said internal liner to the extent of at least 8000 pounds per square inch, said internal liner being essentially non-porous and being made of essentially crystalline material selected from the group consisting of aluminum oxide, silica, magnesium oxide and zirconium oxide and compounds and mixtures thereof, the hard crystals in the material having a hardness greater than 1000 on the Knoop 100 scale, and an inwardly extending flange on one end of said sleeve said flange being in engagement with one end of said internal liner and exerting a compressive force on it in an axial direction.

12. A cylindrical liner assembly comprising an internal cylindrical liner having a ground internal cylindrical surface, an external cylindrical sleeve made of metal and in compression against said internal liner to the extent of at least 8000 pounds per square inch, said internal liner being essentially non-porous and being made of essentially crystalline material selected from the group consisting of alumina, mullite, spinel and zirconia, said crystalline material having a hardness greater than 1000 on the Knoop 100 scale and there being no more than 10% of all material other than said material selected from the group consisting of alumina, mullite, spinel and zirconia in said internal liner, and an inwardly extending flange on one end of said sleeve said flange being in engagement with one end of said internal liner and exerting a compressive force on it in an axial direction.

13. A cylindrical liner assembly comprising an internal liner made of essentially *non-porous* crystalline material selected from the group consisting of aluminum oxide, silica, magnesium oxide and zirconium oxide and compounds and mixtures thereof, the hard crystals in the material [being essentially non-porous and] having a hardness greater than 1000 on the Knoop 100 scale, said internal liner having a ground internal cylindrical surface, an integral exterior with an outer cylindrical surface made of organic plastic material on said internal liner, and a metal sleeve outside of and in compression against said exterior [with] *to* [a pressure] *the extent* of at least 100 pounds per square inch.

14. A cylindrical liner assembly comprising an internal liner made of essentially *non-porous* crystalline material selected from the group consisting of aluminum oxide, silica, magnesium oxide and zirconium oxide and compounds and mixtures thereof, the hard crystals in the material [being essentially non-porous and] having a hardness greater than 1000 on the Knoop 100 scale, said internal liner having a ground internal cylindrical surface, an integral exterior with an outer cylindrical surface made of mineral cement on said internal liner, and a metal sleeve outside of and in compression against said exterior [with a] *to the* [pressure] *extent* of at least 100 pounds per square inch.

15. A cylindrical liner assembly comprising an internal liner made of essentially *non-porous* crystalline material selected from the group consisting of aluminum oxide, silica, magnesium oxide and zirconium oxide and compounds and mixtures thereof, the hard crystals in the material [being essentially non-porous and] having a hardness greater than 1000 on the Knoop 100 scale, said internal liner having a ground internal cylindrical surface, an integral exterior with an outer cylindrical surface made of metal on said internal liner, and a metal sleeve outside of and in compression against said exterior [with a pressure] *to the extent* of at least 100 pounds per square inch.

16. A cylindrical liner assembly comprising an internal liner made of essentially crystalline material selected from the group consisting of alumina, mullite, spinel and zirconia, said crystalline material being essentially non-porous and having a hardness greater than 1000 on the Knoop 100 scale and there being no more than 10% of all material other than said material selected from the group consisting of alumina, mullite, spinel and zirconia in said internal liner, an integral exterior with an outer cylindrical surface made of organic plastic material on said internal liner, and a metal sleeve outside of and in compression against said exterior [with a pressure] *to the extent* of at least 100 pounds per square inch.

17. A cylindrical liner assembly comprising an internal liner made of essentially crystalline material selected from the group consisting of alumina, mullite, spinel and zirconia, said crystalline material being essentially non-porous and having a hardness greater than 1000 on the Knoop 100 scale and there being no more than 10% of all material other than said material selected from the group consisting of alumina, mullite, spinel and zirconia in said internal liner, an integral exterior with an outer cylindrical surface made of mineral cement on said internal liner, and a metal sleeve outside of and in compression against said exterior [with a pressure] *to the extent* of at least 100 pounds per square inch.

18. A cylindrical liner assembly comprising an internal liner made of essentially crystalline material selected from the group consisting of alumina, mullite, spinel and zironia, said crystalline material being essentially non-porous and having a hardness greater than 1000 on the Knoop 100 scale and there being no more than 10% of all material other than said material selected from the group consisting of alumina, mullite, spinel and zirconia in said internal liner, an integral exterior with an outer cylindrical surface made of metal on said internal liner, and a metal sleeve outside of and in compression against said exterior [with a pressure] *to the extent* of at least 100 pounds per square inch.

*19. A cylindrical liner assembly comprising an internal cylindrical liner having a ground internal cylindrical surface, and an external cylindrical sleeve made of metal and in compression against said internal liner to the extent of at least 100 pounds per square inch, said internal liner being essentially non-porous and being made of essentially crystalline material selected from the group consisting of aluminum oxide, silica, magnesium oxide and zirconium oxide and compounds and mixtures thereof, the hard crystals in the material having a hardness greater than 1000 on the Knoop 100 scale, the liner being supported by a shrink interference with the sleeve of at least 0.0001 inch per inch of internal diameter of the sleeve.*

*20. A cylindrical liner assembly comprising an internal cylindrical liner having a ground internal cylindrical surface, and an external cylindrical sleeve made of metal and in compression against said internal liner to the extent of at least 100 pounds per square inch, said internal liner being essentially non-porous and being made of essentially crystalline material selected from the group consisting of alumina, mullite, spinel and zirconia, said crystalline material having a hardness greater than 1000 on the Knoop 100 scale and there being no more than 10% of all material other than said material selected from the group consisting of alumina, mullite, spinel and zirconia in said internal liner, the liner being supported by a shrink interference with the sleeve of at least 0.0001 inch per inch of internal diameter of the sleeve.*

*21. A cylindrical liner assembly according to claim 19 in which the sleeve is in compression against the internal liner to the extent of at least 8000 pounds per square inch.*

*22. A cylindrical liner assembly according to claim 20 in which the sleeve is in compression against the internal liner to the extent of at least 8000 pounds per square inch.*

References Cited in the file of this patent or the original patent

UNITED STATES PATENTS

| | | |
|---|---|---|
| 861,726 | Howell et al. | July 30, 1907 |
| 1,597,249 | Riley | Aug. 24, 1926 |
| 1,831,411 | Dietz | Nov. 10, 1931 |
| 2,204,626 | Scott | June 18, 1940 |

FOREIGN PATENTS

| | | |
|---|---|---|
| 495,824 | Great Britain | Nov. 14, 1938 |